(12) United States Patent
Benjamin et al.

(10) Patent No.: US 8,720,259 B1
(45) Date of Patent: May 13, 2014

(54) DEVICE AND METHOD FOR TESTING A GAS TURBINE ENGINE COMPONENT

(71) Applicant: United Technologies Corporation, Hartford, CT (US)

(72) Inventors: Daniel Benjamin, Simsbury, CT (US); Kaliya Balamurugan, Newington, CT (US); Robert B. Berkley, Moodus, CT (US); Robert L. Williston, Bloomfield, CT (US)

(73) Assignee: United Technologies Corporation, Hartford, CT (US)

( * ) Notice: Subject to any disclaimer, the term of this patent is extended or adjusted under 35 U.S.C. 154(b) by 8 days.

(21) Appl. No.: 13/709,498

(22) Filed: Dec. 10, 2012

(51) Int. Cl.
*G01M 1/04* (2006.01)

(52) U.S. Cl.
USPC .................................................. 73/112.01

(58) Field of Classification Search
USPC .................................................. 73/112.01
See application file for complete search history.

(56) References Cited

U.S. PATENT DOCUMENTS

| | | | |
|---|---|---|---|
| 4,694,689 A | 9/1987 | Kawasaki | |
| 6,566,870 B2 | 5/2003 | Sorenson et al. | |
| 7,539,594 B2 * | 5/2009 | Lee et al. | 702/147 |
| 7,912,587 B2 * | 3/2011 | Walters et al. | 700/279 |
| 8,095,324 B2 | 1/2012 | Dooley | |
| 8,419,270 B2 * | 4/2013 | Wawrzonek et al. | 374/46 |
| 8,567,060 B2 * | 10/2013 | Calvert et al. | 29/889.21 |
| 8,631,575 B2 * | 1/2014 | Walters | 29/889.21 |
| 2007/0014660 A1 * | 1/2007 | Lee | 415/122.1 |
| 2009/0025461 A1 * | 1/2009 | Walters et al. | 73/66 |
| 2009/0165273 A1 | 7/2009 | Calvert et al. | |
| 2009/0316748 A1 | 12/2009 | Wawrzonek et al. | |
| 2009/0320286 A1 | 12/2009 | Walters | |

* cited by examiner

*Primary Examiner* — Freddie Kirkland, III
(74) *Attorney, Agent, or Firm* — Carlson, Gaskey & Olds

(57) ABSTRACT

An exemplary device for testing a gas turbine engine component includes a shaft that is configured to be rotated. A first hub is selectively fixed to the shaft near a first end of the first hub with an opposite, second end spaced from the shaft. A second hub is selectively fixed to the shaft near a first end of the second hub with an opposite, second end spaced from the shaft. The second ends of the hubs each have a feature for supporting the component between the first and second hubs at a location spaced from the shaft for introducing a load on the component near the location.

17 Claims, 3 Drawing Sheets

DEVICE AND METHOD FOR TESTING A GAS TURBINE ENGINE COMPONENT

BACKGROUND

A gas turbine engine typically includes a fan section, a compressor section, a combustor section and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The rotors in the compressors are examples of turbine engine components that rotate and must be capable of withstanding potentially deforming forces that occur during operation and up to a preassigned overspeed condition.

SUMMARY

An exemplary device for testing a gas turbine engine component includes a shaft that is configured to be rotated. A first hub is selectively fixed to the shaft near a first end of the hub and has an opposite, second end spaced radially from the shaft. A second hub is selectively fixed to the shaft near a first end of the second hub and has an opposite, second end spaced radially from the shaft. The second ends of the hubs each have a feature for supporting the component between the first and second hubs at a location spaced radially from the shaft for introducing a load on the component near the location.

An embodiment having one or more features of the device of the preceding paragraph comprises at least one support member configured for being received between the first and second hub with the component for supporting the component in a manner that corresponds to how the component would be supported in a gas turbine engine.

In an embodiment having one or more features of any of the devices of the preceding paragraphs, the component comprises a rotor and the at least one support member has a configuration corresponding to a rotor.

An embodiment having one or more features of any of the devices of the preceding paragraphs comprises a coupling member that selectively secures the first end of at least one of the hub members in a fixed position on the shaft.

In an embodiment having one or more features of any of the devices of the preceding paragraphs, at least one of the hubs includes a bore member situated between the second end of the hub and the first end, the bore member is spaced from the shaft, and the device comprises a spacer configured to react to a deflection of the bore member in a selected position and orientation relative to the shaft.

In an embodiment having one or more features of any of the devices of the preceding paragraphs, the spacer has a first end connected with the shaft near the first end of the one of the hubs and a second end that is received against a portion of the bore member.

In an embodiment having one or more features of any of the devices of the preceding paragraphs, the load has a direction that is parallel to a longitudinal axis of the shaft.

In an embodiment having one or more features of any of the devices of the preceding paragraphs, the component comprises a rotor having an inner bore portion and an outer rim portion radially spaced from the bore portion, the rotor is supported by the hubs near the outer rim portion, and a distance between the second end of each hub and the shaft has a dimensional relationship with a size of the rotor that establishes a spacing between the bore portion and the shaft.

In an embodiment having one or more features of any of the devices of the preceding paragraphs, at least one of the hubs has a curvilinear profile between the first and second ends.

An embodiment having one or more features of any of the devices of the preceding paragraphs comprises a reversed fit between at least one of the hubs and the shaft.

In an embodiment having one or more features of any of the devices of the preceding paragraphs, the reversed fit is established between a recess on the at least one of the hubs and a flange of the shaft.

An exemplary method of testing a gas turbine engine component includes providing a testing device including a shaft, a first hub having a first end selectively fixed to the shaft and a second hub having a first end selectively fixed to the shaft. The component is supported between second ends of the hubs at a location spaced from the shaft. Rotating the shaft, the hubs and the component introduces a load on the component near the location.

In an example embodiment having one or more features of the method of the preceding paragraph, the load has a direction that is generally parallel to a longitudinal axis of the shaft.

In an example embodiment having one or more features of any of the methods of the two preceding paragraphs, the method includes situating at least one support member between the second ends of the hubs with the component for simulating a manner in which the component would be supported in a gas turbine engine.

In an example embodiment having one or more features of any of the methods of the preceding three paragraphs, the component comprises a rotor.

In an example embodiment having one or more features of any of the methods of the preceding paragraphs, the testing device is preloaded at a predetermined preload prior to the rotating.

In an example embodiment having one or more features of any of the methods of the preceding paragraphs, a reversed fit is established between the shaft and at least one of the hubs.

The various features and advantages of disclosed examples will become apparent to those skilled in the art from the following detailed description. The drawings that accompany the detailed description can be described as follows.

DETAILED DESCRIPTION

Figure 1:
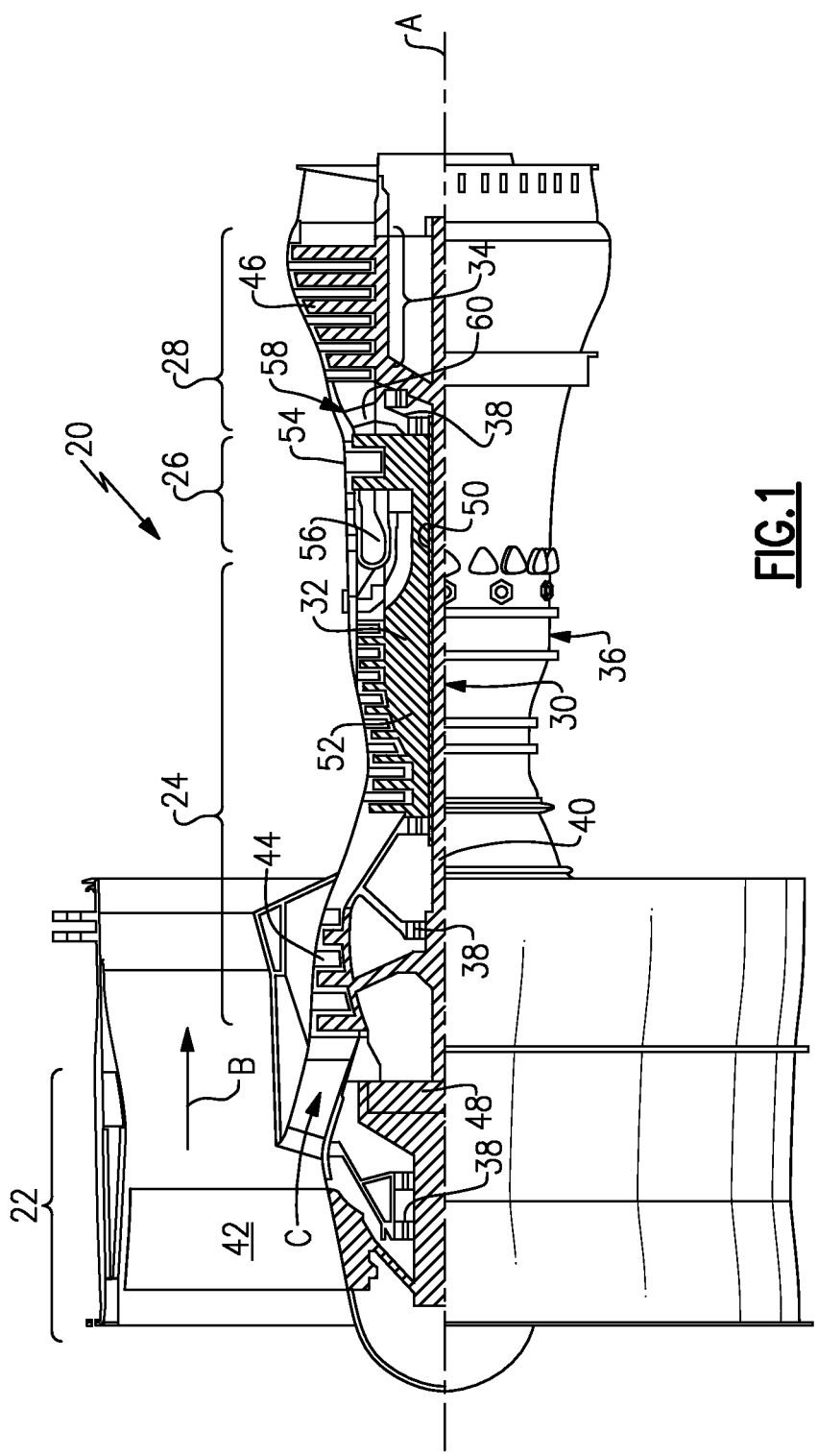
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to the combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts disclosed in this description and the accompanying drawings are not limited to use with turbofans as the teachings may be applied to other types of turbine engines, such as a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used in this description, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 and sets airflow entering the low pressure turbine 46.

The core airflow C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °\ R)/518.7°\ R)]^{0.5}$. The "Low corrected fan tip speed", according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
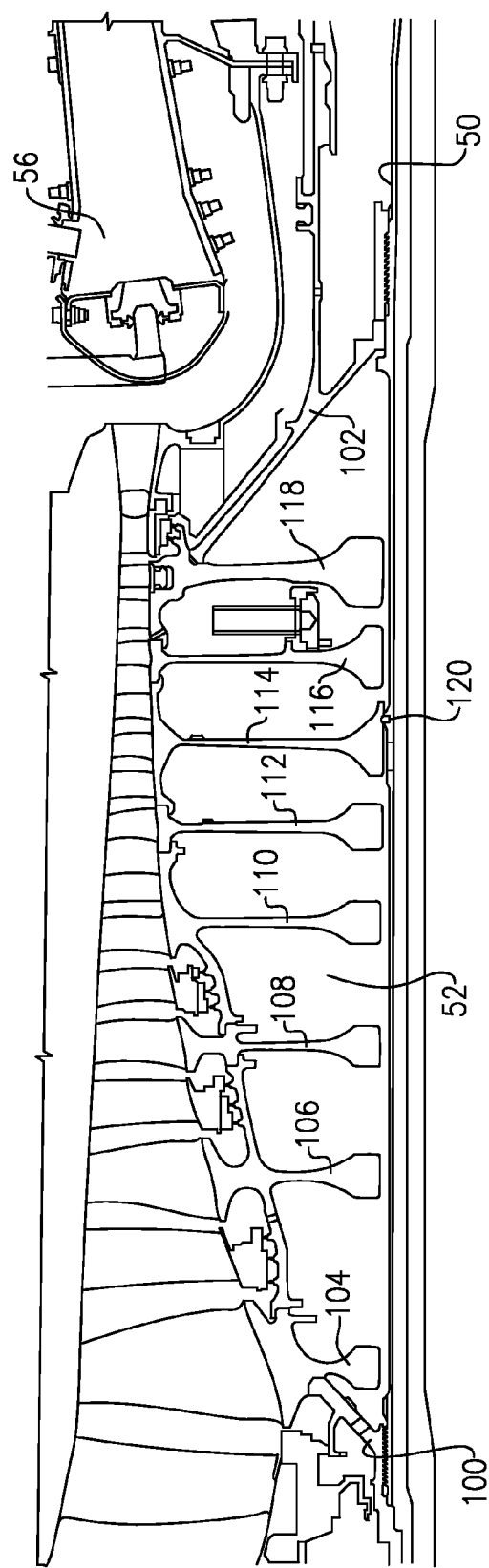
FIG. 2 schematically illustrates selected portions of the example gas turbine engine.

FIG. 2 schematically illustrates a selected portion of the gas turbine engine 20. FIG. 2 schematically shows the compressor 52, which is a high pressure compressor in this example. The compressor 52 includes compressor hubs 100 and 102 near opposite axial ends of the compressor. A plurality of rotors 104, 106, 108, 110, 112, 114, 116 and 118 are supported within the compressor 52 in a known manner. During compressor operation, the rotors rotate at high speeds.

The rotors 104-118 must be capable of withstanding the conditions that occur during engine operation and demonstrate conformance to requirements stipulated by regulatory bodies such as rotor integrity for a specific time duration during conditions exceeding maximum operation speed at the limiting temperature (e.g., overspeed). For example, the rotors should demonstrate limited deformation consistent with the rotors' structural integrity at conditions that exceed the most demanding operating condition such as 120% of maximum operating speed at the limiting temperature. Additionally, the rotors must be able to withstand the conditions associated with low cycle fatigue.

One feature of the illustrated compressor 52 is that it includes a piston ring 120 that essentially divides the compressor into two different cavities on opposite sides of the rotor 114.

Figure 3:
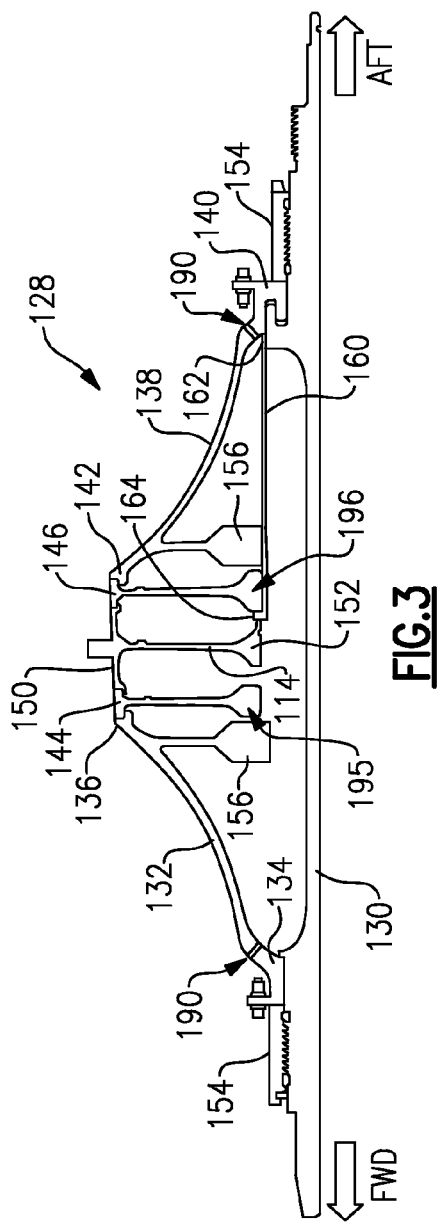
FIG. 3 schematically illustrates an example device for testing a gas turbine engine component.

FIG. 3 schematically illustrates a testing device 128 for testing gas turbine engine components. In this case the rotor 114 is called a test specimen or test article. A shaft 130 is situated for rotating about a longitudinal axis X. In one example, the device 128 is configured to fit within a known spin test chamber in which the entire device 128 may be spun in vacuum at the required speed and temperatures conditions.

The example device includes two hubs. A first hub 132 is secured to the shaft 130 near a first end 134 of the first hub 132. A second end 136 of the first hub 132 remains spaced radially from the shaft 130. A second hub 138 is secured to the shaft 130 near a first end 140 of the second hub 138. A second end 142 of the second hub 138 remains spaced radially from the shaft 130.

The example device is useful for testing any and all of the rotors. In the illustration of FIG. 3, the rotor 114, which is the test specimen, is supported by the second ends 136 and 142 of the hubs 132 and 138. Supporting the rotor 114 by the second ends 136 and 142 allows for introducing a load on the rotor 114 at the location where the rotor 114 is supported by the device 128. In this example, support members 144 and 146 are received between the second ends 136 and 142 of the hubs 132 and 138. The support members 144 and 146 in this example are configured like rotors because the component that is being tested is a rotor. The support members 144 and 146 can be considered "slave" rotors that feature similar geometry to actual engine rotors, but airfoils may be removed for test instrumentation purposes and bores may be modified for burst requirements. The support members 144 and 146 facilitate situating the rotor 114 within the test device 128 in a manner that simulates the way in which the rotor 114 will be situated within a gas turbine engine. The example testing device 128 allows for introducing rim loads on the rotor 114 during a testing procedure that simulates the loads on the rotor 114 during engine operation and/or overspeed testing.

Figure 4:
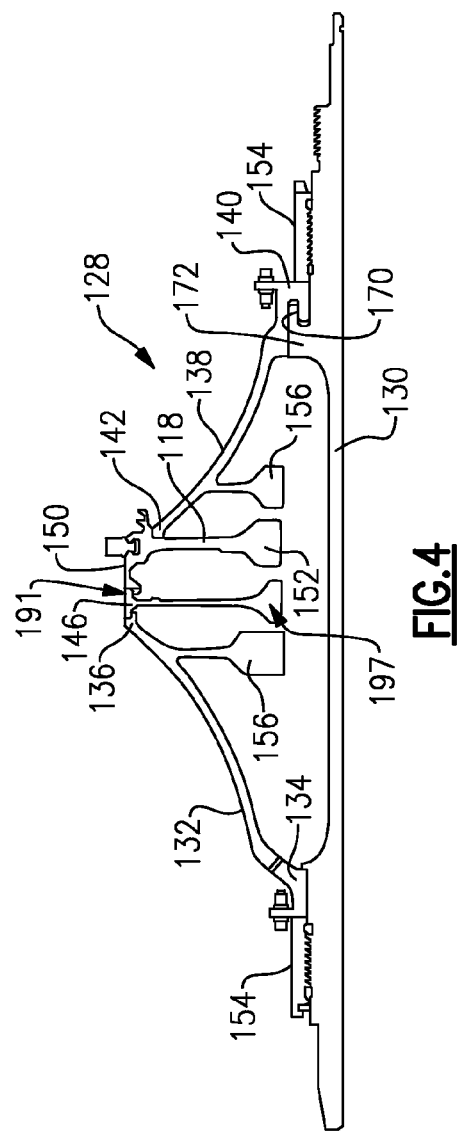
FIG. 4 schematically illustrates another gas turbine engine component with the example testing device.

As shown in FIGS. 3 and 4, vent orifices 190 and/or 191 are provided in either the hub 132 and/or 138 or the rotors to allow air circulation during application of vacuum prior to test and re-pressurization after test.

The example rotor 114 includes an outer rim portion 150 and an inner bore portion 152. The inner bore portion 152 establishes an inner diameter of the rotor 114 in a known manner. The support members 144 and 146 are received against the outer rim portion 150 on opposite sides of the rotor 114 in this example. The rotor 114 and the support members 144 and 146 are clamped between the ends 136 and 142 by securing the hubs 132 and 138 in place using securing members 154. In this example, the securing members 154 comprise nuts that are received over a threaded portion on the shaft 130.

With the stack of components situated in the condition illustrated in FIG. 3, the test device 128 simulates speed and temperature conditions required for testing the rotor 114. The support members 144 and 146 simulate engine boundary conditions such as those that the rotor 114 would be subjected to within a gas turbine engine. With the illustrated arrangement, an axial load is applied to the rim portion 150 of the rotor 114. This provides superior testing conditions compared to an arrangement in which an isolated rotor disk would have been tested using previously known methods. The axial load, including an axial preload on the rim portion 150 consistent with engine configuration conditions, simulates the so-called plastic hinge effect during an engine over speed condition. The illustrated example is therefore, superior to other testing arrangements that are not capable of simulating engine conditions and do not provide an axial pre-load near the rim portion 150.

As test device 128 rotates about the axis X, the rotor 114 is subject to forces such as those that would be experienced during test conditions or low cycle fatigue conditions. Given this description, those skilled in the art will realize how to analyze the results of such a test.

The example of FIG. 3 includes a feature that is useful for simulating the conditions associated with the two cavities established within the compressor 52 of FIG. 2. As mentioned above, the rotor 114 serves as a pressure wall between the two cavities on opposite sides of the rotor 114. A known spin test chamber usually includes a vacuum pressure within the entire chamber. For purposes of simulating the different pressures that the rotor 114 may experience during engine operation if the rotor 114 were placed within a gas turbine engine, the example of FIG. 3 includes a spacer 160. One end of the spacer at 162 is secured to the shaft 130. An opposite end 164 of the spacer 160 is received against the bore portion 152 of the rotor 114. The spacer 160 length and axial location are designed to resist the axial deflection of bore 152 and simulate the strain for a component being tested such as the rotor 114 due to the pressure differential across its web. The spacer 160 allows for testing such pressure differential conditions even though the entire device 128 is situated within a known spin test chamber that applies a vacuum pressure of equal magnitude on both sides of the rotor 114.

In this example, the first hub 132 and the second hub 138 are generally bell-shaped and have a curvilinear profile between their respective first ends and second ends. In this example, each hub includes a bore portion 156 extending from an inner wall on the hub.

FIG. 4 illustrates the device 128 situated for a different test component in this case the rotor 150 is the test specimen or test article. In this example, the rotor 118 is supported between the second ends 136 and 142 of the hubs 132 and 138, respectively. Given that the rotor 118 is situated within a compressor in a gas turbine engine differently than the rotor 114 would be situated, the arrangement of the components of the device 128 are different in FIG. 4 compared to the arrangement shown in FIG. 3. For example, the support member 146 is received between the second end 136 and the rim portion 150 of the rotor 118. Only one support member is used in this example. The rotor 118 is received directly against the second end 142 of the second hub 138 in this example. By comparing the relative positions of the rotors 114 and 118 in FIG. 2 in view of FIGS. 3 and 4, it is possible to appreciate how the testing device 128 allows for simulating engine operating or overspeed conditions for purposes of testing different components of interest. If the test specimen is not integrally bladed, but carries non-integral blades, the blades can be removed and replaced with an equivalent mass.

In the examples of FIGS. 3 and 4, the bore portions 152 remain spaced radially from the shaft 130 when the rotor is supported by the second ends 136 and 142 of the hubs 132 and 138, respectively. The radial position of the second end 136 is established by the rotors 144 and 146. The second end 142 radial position is established by the rotors 146 and 148. The distance between the second ends 136 and 142 on the one hand and the shaft 130 on the other hand, has a dimensional relationship to a distance between the rim portion 150 and the bore portion 152 such that the bore portion 152 remains spaced from the shaft 130 when the rotor 114 is situated within the testing device 128 as illustrated. Bore portions 156 of hubs 132 and 138 as well as bores of support members 144 and 146 are designed to ensure the necessary burst margin is maintained for the test specimen and the other rotors and hubs in the stack.

In the examples of FIGS. 3 and 4, a reversed fit is used for the first end 134 of the second hub 138 that provides an interference fit between the hub 138 and the shaft 130. The reversed fit will resist the growth of the hub 138 without becoming loose at all times during test. A very large interference fit that would remain tight during test is impractical because it introduces high stresses and high axial loads during rig assembly that will impede the stretch operation required to apply the preload to the rotors stack. The reversed fit features the inner diameter for the inner mating part (i.e., the shaft 130) against the outer diameter of the outer mating part (i.e., the hub 138). The reversed fit can be used for either or both of the first and second hubs 132 and 138.

The reversed fit in the illustrated example includes a forward facing notch or recess 170 within which a flange or tab 172 of the shaft 130 is received. The flange or tab 172 faces in aft direction.

The preload to the test specimen is applied by the combination of shaft stretch and rotors stack compression against the securing member 154, then locked in by the securing member 154.

Applying a load on a component such as a rotor along a load path that closely replicates the actual rim loading provides superior test results and provides testing conditions that simulate actual conditions that would occur during engine operation and/or overspeed.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for testing a gas turbine engine component, comprising:
    a shaft that is configured to be rotated;
    a first hub that is selectively fixed to the shaft near a first end of the first hub with an opposite, second end spaced from the shaft;
    a second hub that is selectively fixed to the shaft near a first end of the second hub with an opposite, second end spaced from the shaft, the second ends having a feature for supporting the component between the first and second hubs at a location spaced from the shaft for introducing a load on the component near the location.

2. The device of claim 1, wherein the device comprises at least one support member configured for being received between the first and second hub with the component for supporting the component in a manner that corresponds to how the component would be supported in a gas turbine engine.

3. The device of claim 2, wherein the component comprises a rotor and the at least one support member has a configuration corresponding to a rotor.

4. The device of claim 1, comprising a coupling member that selectively secures the first end of at least one of the hub members in a fixed position on the shaft.

5. The device of claim 1, wherein
    at least one of the hubs includes a bore member situated between the second end of the hub and the first end;
    the bore member is spaced from the shaft; and
    the device comprises a spacer configured to react to a deflection of the bore member in a selected position and orientation relative to the shaft.

6. The device of claim 5, wherein the spacer has a first end connected with the shaft near the first end of the one of the hubs and a second end that is received against a portion of the bore member.

7. The device of claim 1, wherein the load has a direction that is parallel to a longitudinal axis of the shaft.

8. The device of claim 1, wherein
    the component comprises a rotor having an inner bore portion and an outer rim portion radially spaced from the bore portion;
    the rotor is supported by the hubs near the outer rim portion; and
    a distance between the second end of each hub and the shaft has a dimensional relationship with a distance between the inner bore portion and the outer rim portion that establishes a space between the bore portion and the shaft.

9. The device of claim 1, wherein at least one of the hubs has a curvilinear profile between the first and second ends.

10. The device of claim 1, comprising a reversed fit between at least one of the hubs and the shaft.

11. The device of claim 10, wherein the reversed fit is established between a recess on the at least one of the hubs and a flange of the shaft.

12. A method of testing a gas turbine engine component, comprising the steps of:
    providing a testing device including a shaft, a first hub having a first end selectively fixed to the shaft and a second hub having a first end selectively fixed to the shaft;
    supporting the component between second ends of the hubs at a location spaced from the shaft; and
    rotating the shaft, hubs and the component in a manner that introduces a load on the component near the location.

13. The method of claim 12, wherein the load has a direction that is generally parallel to a longitudinal axis of the shaft.

14. The method of claim 12, comprising
    situating at least one support member between the second ends of the hubs with the component for simulating a manner in which the component would be supported in a gas turbine engine.

15. The method of claim 12, wherein the component comprises a rotor.

16. The method of claim 10, comprising preloading the testing device at a predetermined preload prior to the rotating.

17. The method of claim 12, comprising establishing a reversed fit between the shaft and at least one of the hubs.

* * * * *